United States Patent [19]

Weskamp et al.

[11] Patent Number: 4,906,123
[45] Date of Patent: Mar. 6, 1990

[54] QUICK CHANGECOUPLING SYSTEM FOR ROBOTIC ATTACHMENTS

[75] Inventors: Robert Weskamp, Buffalo Grove; M. Richard Tennerstedt, Wilmette, both of Ill.

[73] Assignee: Wes-Tech, Inc., Buffalo Grove, Ill.

[21] Appl. No.: 163,275

[22] Filed: Mar. 2, 1988

[51] Int. Cl.[4] .............................. F16B 7/00; B25J 17/02
[52] U.S. Cl. .................................. 403/322; 403/325; 403/328; 901/28
[58] Field of Search ............... 403/322, 324, 325, 328; 901/29, 28, 27

[56] References Cited

U.S. PATENT DOCUMENTS

| | | | |
|---|---|---|---|
| 2,290,215 | 7/1942 | Stenberg | 403/328 |
| 3,065,011 | 11/1962 | De Pew | 403/328 |
| 3,693,484 | 9/1972 | Sanderson, Jr. | 403/325 X |
| 4,289,414 | 9/1981 | Recker | 403/325 X |
| 4,318,630 | 3/1982 | Herchenbach et al. | 403/322 |
| 4,453,449 | 6/1984 | Hollmann | 403/322 X |
| 4,636,135 | 1/1987 | Bancon | 901/28 X |
| 4,663,796 | 5/1987 | Helling et al. | 403/328 X |
| 4,676,142 | 6/1987 | McCormick et al. | 901/29 X |
| 4,793,053 | 12/1988 | Zuccaro et al. | 403/328 X |
| 4,815,780 | 3/1989 | Obrist | 403/325 X |

*Primary Examiner*—Randolph A. Reese
*Assistant Examiner*—Peter M. Cuomo
*Attorney, Agent, or Firm*—Baker & McKenzie

[57] ABSTRACT

This invention relates generally to a coupling system for releasably attaching any one of a number of robotically controlled tools (robotic "hands") to a robotically controlled extension arm. The coupling system tightly locks the hand to the robotic arm by combined air and spring pressure such that, even under heavy duty use, the hand will not unintentionally twist or move relative to the arm, yet the hand and arm may be quickly disengaged by release of locking air pressure and imposition of unlocking air pressure which enables ball means to be cammed out of locking engagement.

7 Claims, 1 Drawing Sheet

QUICK CHANGECOUPLING SYSTEM FOR ROBOTIC ATTACHMENTS

FIELD OF THE INVENTION

This invention relates generally to a coupling system for releasably attaching any one of a number of robotically controlled tools, hereafter referred to as robotic "hands", to a robotically controlled extension arm. More specifically, the coupling system of this invention provides rapid replacement of tools, thereby facilitating pick and place operations and, following completion of change, tightly locks a hand to a robotic arm such that the hand will not unintentionally twist or move relative to the arm.

BACKGROUND OF THE INVENTION

Robotic systems typically perform tasks by means of specialized robotic "hands" which are releasably coupled to robotic arms. Over the years, these robotic hands have become very sophisticated and are now capable of performing complex operations by means of meticulously precise movements.

Conventional robotic hand and arm combinations often include one or more controllers which are usually linked to a mechanical drive system, such as an electric motor with its associated gearing. However, the mechanical movement of the mechanical drive system must then be transferred through the robotic arm to the hand.

Unfortunately, many conventional coupling systems are so prone to unintentional shifting and twisting that the accurate movements of the drive system are not accurately transferred to the robotic hand, making the system unreliable.

Robotic hand-arm couplers are preferably designed to allow for quick and easy engagement and disengagement between the hand and arm, because a detachable design provides necessary flexibility, thereby allowing users to choose different types of hands as required for different operations. Also, the detachable design makes repair and servicing of the hand much simpler and more economical. In short, a quick change function is highly desirable.

Once engaged and constrained against unintended longitudinal separations, rotational movement between the hand and arm is often precluded by a gear tooth type connector. One particular type of such connector known in the tooling industry is a curved tooth gear as disclosed in Belansky U.S. Pat. No. 4,307,797 entitled "Curved Tooth Gear Coupling." A curved tooth gear coupling typically comprises two interlocking gear plates, each gear plate having curved teeth and tooth patterns which mirror the other and thereby lock together. In such gear couplers, both the pressure angle and the spiral angle for any contact point on either the concave or convex side of the curved gear tooth on the first coupling half, is equal to the corresponding angle for the corresponding point on the convex or concave tooth of the second coupling half, and the cross-sectional dimension of the tooth may increase from the inside to the outside of the gear.

A primary object of this invention is to provide a system for coupling a robot hand to a robot arm very rapidly in an accurate and reliable manner whereby change is achieved.

A further object of this invention is to provide a robotic arm and hand coupling system which can be easily operated without specialized skill or training.

Yet another object is to provide a robotic arm and hand coupling system wherein the hand will not unintentionally detach if power is interrupted to the system.

A further object is to provide a robotic arm and hand coupling system which is reliable and inexpensive to manufacture.

Another object is to provide a robotic arm and hand coupling system which is substantially maintenance free.

Other objects and features of the invention will become apparent to those skilled in the art from the following specification when read in the light of the annexed drawings.

SUMMARY OF THE INVENTION

This invention relates generally to a coupler for quickly and reliably attaching any one of a number of robotically controlled "hands" to a robotic extension arm. The coupling system of this invention locks the hand to the arm so tightly that the tool will not intentionally twist or move relative to the arm during use. Furthermore, an operator can quickly, easily, and safely engage and disengage the hand and arm without the need for specialized training.

DESCRIPTION OF THE DRAWINGS

The invention is illustrated more or less diagrammatically in the accompanying drawings wherein.

DESCRIPTION OF THE PREFERRED EMBODIMENT

Figure 1:
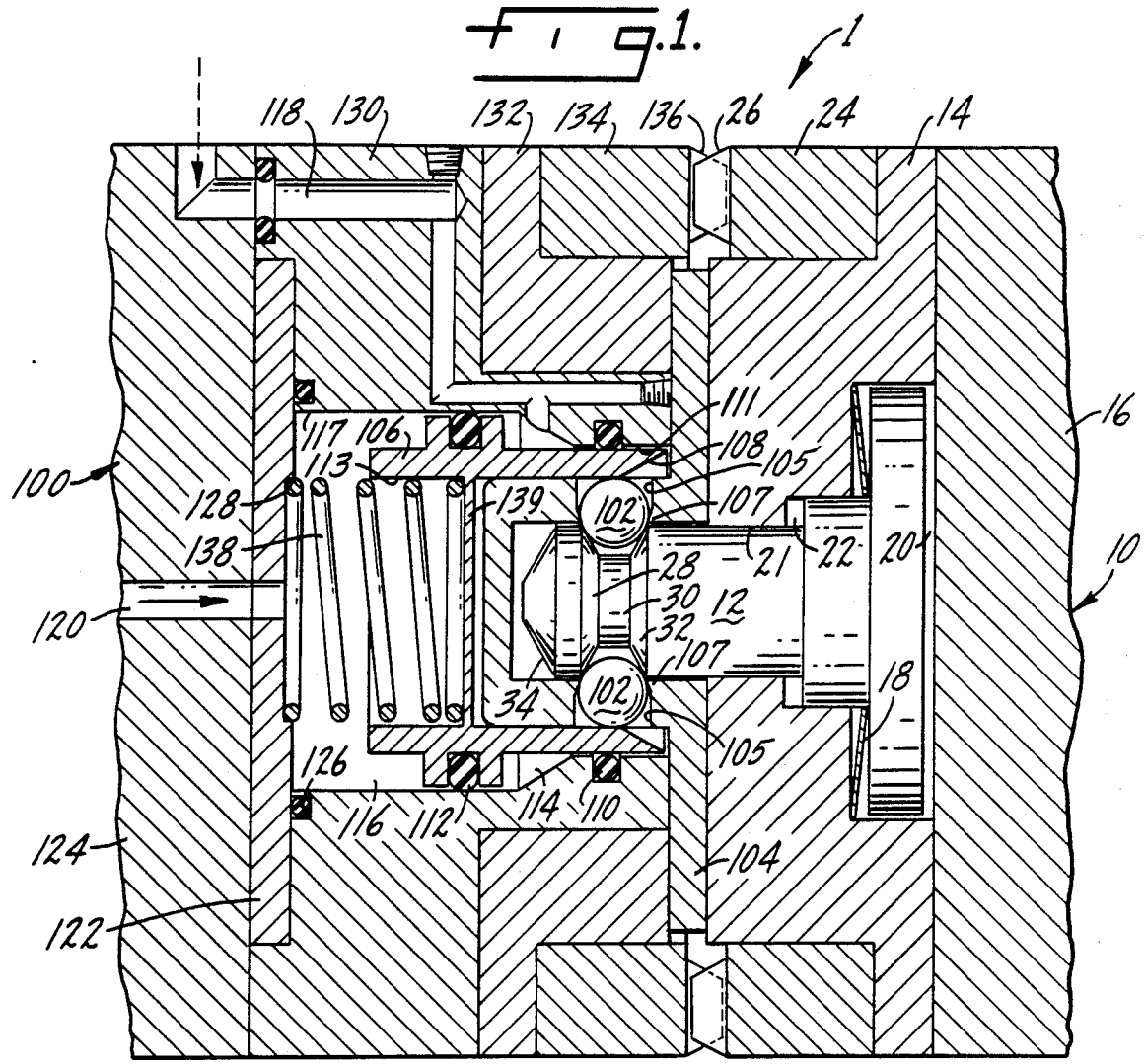
FIG. 1 is an axial cross sectional view of the preferred embodiment.

Like reference numerals will be used to refer to like parts from Figure to Figure in the following description of the preferred embodiment of the invention.

Introduction

In FIG. 1, an axial cross section of the preferred embodiment is shown generally at 1. This embodiment comprises two detachable sections, a robotic hand shown generally at 10 and a robotic arm shown generally at 100. For clarity, elements of the hand will be indicated with numbers 10 through 99, and elements of the arm will be indicated with numbers 100 through 199.

The Robotic Hand

Hand or retention unit 10 has a tooling plate 16 which is fastened to a retainer pin housing 14. The retainer pin housing 14 has a chamber which receives retainer pin 12. The retainer pin has a section protruding through rear opening 21 of housing 14. Opening 21 is of sufficient size to keep the retainer pin in general axial alignment but is not so tight as to preclude forward and rearward movement provided by rear clearance 22 and forward clearance 20. Although the retainer pin is able to slide within the housing, a bellville spring 18 biases the retainer pin in a forward direction.

The retainer pin's rear portion has a notch 30, defined by rearward inclined surface 28 and forward inclined surface 32. The hand further includes a curved tooth gear plate 24 having gear teeth 26 along the outer perimeter of housing 14.

The hand therefore comprises curved gear teeth along the periphery of its rear outside surface and a centrally located, rearwardly protruding, and axially aligned retainer pin which slides forwardly and rearwardly against the forward bias of a spring. The rear portion o the retainer pin defines a blunted point and a notch.

The Arm

Arm 100 has a main housing 124 to which is fastened spring retainer plate 122 and sleeve support 130. The sleeve support, while providing axial support to sleeve 106, allows sleeve 106 to slide forwardly and rearwardly along the inner surface 117 against a forward bias created by compression spring 138. The rear portion of spring 138 is held in position by means of spring seat 128, and the spring's forward portion is held in position by vertical sleeve wall 139 and inner surface 113 of sleeve 106 which, together, form a spring seat.

Sleeve 106 carries an air seal 112. To move the sleeve forward, air pressure is applied through air pressure line 120, thereby increasing pressure in compartment 116 defined by sleeve support 130, spring retainer plate 122, and sleeve 106. The compartment is substantially air tight due to seal 112 and seal 126. The increased air pressure together with the force exerted by spring 138 causes the seal 112 and the sleeve 106 to slide forward along inner wall 117 of sleeve support 130.

As sleeve 106 slides forward into its forward locked position, its forward portion slides over the outside surface of ball housing 104 which is fastened to support 132, thereby closing the radial openings of aperture 105 in ball support 104 within which ball 102 moves. This locked position is illustrated in FIG. 1.

The inward radial movement of balls 102 is constrained by ridge 107 along the inner surface of apertures 105 which narrows the opening at the inner surface, thereby making the opening smaller in diameter than the diameter of the balls. This precludes balls from falling from ball support 104 when the hand is not engaged with the arm.

Sleeve 106 is pushed back into its unlocked position by decreasing pressure in rear compartment 116 by means of air line 120 and by increasing air pressure in forward compartment 114 by means of air line 118. Forward compartment 114 is defined by housing 130 and sleeve 106 and is made substantially air tight by means of air seals 112 and 110. As pressure builds in compartment 114, air seal 112 and sleeve 106 are pushed rearwardly along inner surface 117 of sleeve support 130. The air pressure must be of sufficient magnitude to overcome the forward bias of spring 138.

Once the sleeve is in its rear unlocked posit balls 102 are free to move radially outward relative to ball support 104 through support opening 105, under the camming action derived from inclined surface 28, but ultimtely blocked by surface 111 of sleeve housing 130. When the sleeve is moved back into its locked position, the inclined forward portion 108 of sleeve 106 pushes the balls radially inward, ultimately locking the balls in place as shown in FIG. 1.

Sleeve housing 130 is fastened to ring support 132 which in turn is fastened to ball support 104. Support 132 is also fastened to curved tooth gear plate 134. The gear plate 134 has gear teeth 136 which are complementary to gear teeth 26 of hand 10.

The arm thereby houses an axially supported sleeve which slides forwardly and rearwardly by means of air pressure against a forward bias of a spring. The sleeve's forward locking position precludes the balls carried by the arm from moving radially outward.

Hand and Arm Engagement

As can be seen by FIG. 1, the robotic hand 10 attaches to robotic arm 100 by means of retainer pin 12 secured to the arm by balls 102.

Figure 2:
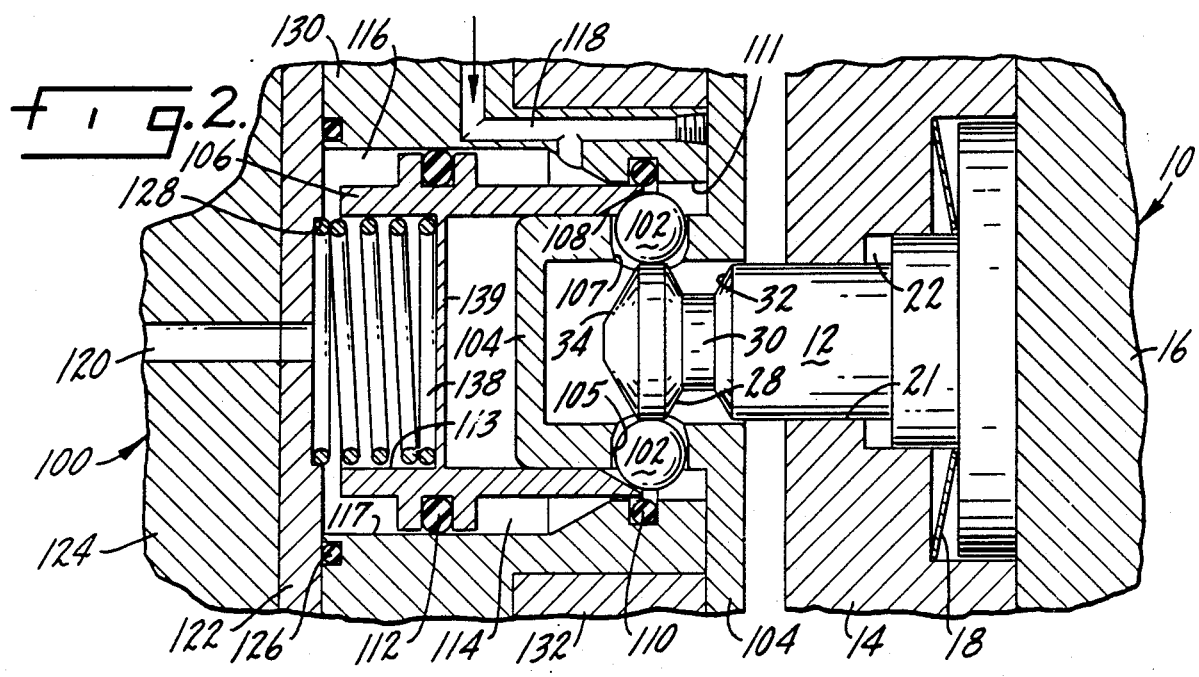
FIG. 2 illustrates an intermediate position of the hand and arm during engagement or disengagement.

As shown in FIG. 2, to engage the hand with the arm, sleeve 106 is moved rearwardly by means of air pressure through air line 118. As the hand and arm are pushed together, the curved teeth 26 of the hand 10 are meshed with complementary curved teeth 136 of the arm 100. Also, the forward portion of the retainer pin 12 is pushed into the retainer pin receiving compartment defined by ball support 104. The blunt point of the retainer pin's front tip, defined by inclined surface 34, pushes the ball bearings radially outward as the retainer pin moves into the receiving compartment, and the balls are ultimately positioned over (or under) notch 30 when the hand is fully inserted into the arm.

Thereafter, air pressure in compartment 114 is decreased by means of air line 118 and air pressure in compartment 116 is increased by means of air line 120, thereby pushing the sleeve forward. As the sleeve moves forward, the inclined forward portions 108 of sleeve 106 gradually push the balls into notch 30. When the sleeve is in its forward locked position, the balls are precluded from moving radially outward away from the notch, because the sleeve forms a confining radial barrier.

Spring 138 biases the sleeve toward its forward locking position. Therefore the hand cannot unintentionally disengage from the arm if power is interrupted to the system, because the spring prevents the sleeve from vibrating or moving to the unlocked position, unless sufficient unlocking air pressure is applied through air line 118. This creates a fail-safe feature and precludes accidental damage to the hand due to unintentional detachment, operator error or equipment failure.

The fail-safe feature requires sleeve 106 to have travelled fully to the right in order that balls 102 are captured by the cylindrical inside surface of sleeve 106 and are no longer in contact with the inclined forward portion 108 of sleeve 106. It is apparent that the exact axial position of the body of the retainer pin 12 will be determined by the manufacturing tolerences of several parts, yet it is desired that the hand 10 be forcibly pulled toward the arms 100 so that gear teeth 26 and 136 are in tight engagement. The axial connection of retainer pin 12 to the hand 10 is through spring 18. This allows substantial manufacturing tolerances and resulting different axial positions of retainer pin 12 to have but a small affect on the clamping force between hand 10 and arm 100.

Hand and Arm Disengagement

To disengage the hand from the arm, air line 120 is depressurized, thereby decreasing the pressure in compartment 116, and pressure is increased in compartment 114 by means of air line 118, thereby causing the sleeve 106 to move rearward to its unlocked position against the forward bias of spring 138. Thereafter, an unskilled operator need only give a firm tug on the hand 10 to cause forward inclined surface 28 of notch 30 to push the balls radially outward, thereby allowing the hand to be pulled away from the robotic arm.

Scope of the Invention

It should be understood that the foregoing disclosure relates to only the preferred embodiment of the invention and that numerous modifications or alterations may be made therein without departing from the spirit and scope of the invention as set forth in the appended claims.

We claim:

1. A quick change coupling system for robotic attachments, said system comprising:

a robotic hand in releasable engagement with a robotic arm, said hand having a retainer pin protruding therefrom, said retainer pin having an annular notch, said pin having an enlarged base movably carried within said robotic hand, resilient mounting means for allowing resilient axial movement of said pin relative to said hand, said resilient mounting means urging said base and said pin in a direction away from said arm when said arm and said hand are engaged;

said arm comprising a support for ball means, said support carrying at least one ball along its inner surface;

said hand retainer pin releasably engaged with said ball support;

restraining means allowing said balls to move into said retainer pin notch when said retainer in is fully inserted into said support;

sleeve means slidable along the outside of surface of said ball support, said sleeve means having a forward locked position substantially precluding said ball means from moving away from said notch when said hand is engaged with said arm; and said sleeve means having a rearward position allowing said ball means to move away from said notch.

2. The quick change coupling system of claim 1 wherein said hand comprises gear teeth which releasably engage complementary gear teeth on said arm.

3. The quick change coupling system of claim 2 wherein said notch defines an inclined surface, said inclined surface biasing said ball means away from said notch when a pulling force is placed on said hand relative to said arm.

4. The quick change coupling system of claim 3 wherein said sleeve has a forward inclined portion which gradually restrains said ball means from moving away from said notch as said sleeve is moved forward; and said movement of said sleeve being controlled by fluid pressure.

5. The quick change coupling system of claim 4 wherein said resilient mounting means includes spring means in contact with the base of said retainer pin biasing said hand toward said arm when said arm and said hand are coupled together.

6. The quick change coupling system of claim 5 wherein said arm further defines a compartment enclosing said sleeve, said sleeve carrying a seal and being movable within said compartment;

connecting means for applying fluid pressure behind said seal; and connecting means for applying fluid pressure in front of said seal.

7. The quick change coupling system of claim 6 wherein said spring means comprises a bellville spring.

* * * * *